UNITED STATES PATENT OFFICE.

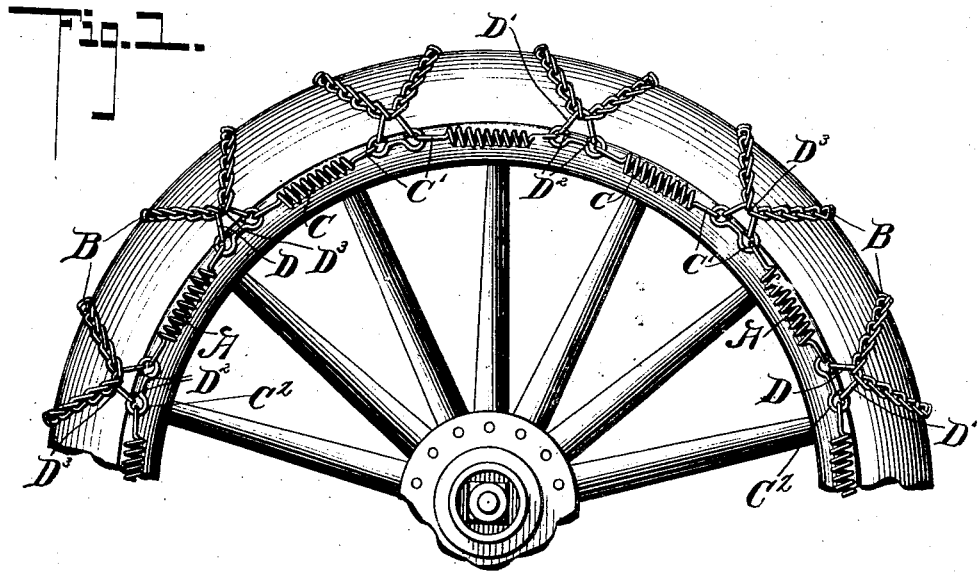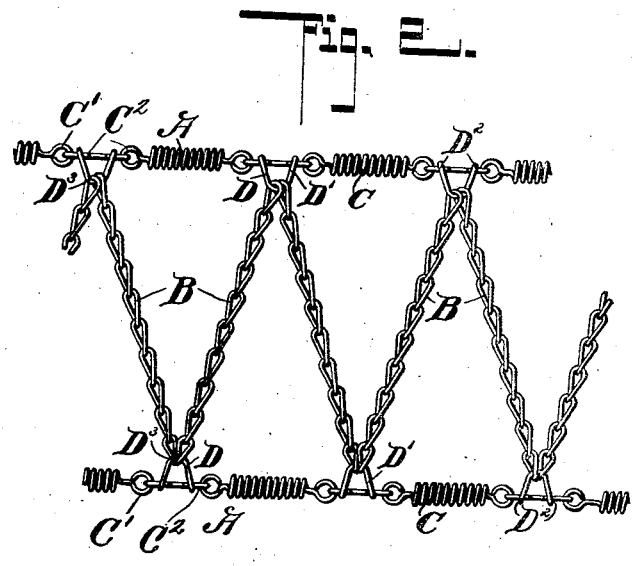

CHARLES E. ABRAMS AND CHARLES H. MASON, OF CHATHAM, NEW YORK.

ELASTIC NON-SKIDDING TIRE-CHAIN.

954,844.      Specification of Letters Patent.      Patented Apr. 12, 1910.

Application filed November 16, 1907. Serial No. 402,465.

*To all whom it may concern:*

Be it known that we, CHARLES E. ABRAMS and CHARLES H. MASON, citizens of the United States, and residents of Chatham, in the county of Columbia and State of New York, have invented certain new and useful Improvements in Elastic Non - Skidding Tire-Chains, of which the following is a specification.

The invention is an improved form of non-skidding chain for automobile wheels, but it will be understood that it can be applied to motor cycle, bicycle and other wheels if desired.

The object of the invention is to provide an elastic form of chain which will hug the tire tightly and still have resiliency enough to prevent cutting or wearing the tire.

The invention consists broadly in the employment of a plurality of cross chains and two circumferential side chains to which the cross chains are connected, said circumferential chains being constructed in part of spring links, which makes said chains elastic.

The invention consists also in certain details of construction and novelties of combination, all of which will be duly described and hereinafter pointed out in the claim.

In the drawings forming a part of this specification Figure 1 is a detail side view of a portion of a wheel with our chain applied thereto, and Fig. 2 is a plan view of a portion of the chain detached.

In carrying out our invention we employ two circumferential or rim chains, A and a plurality of cross or tire chains B which are arranged in zigzag order and connected to the side chains A. The cross chains B are composed of the usual twisted links and are preferably about seven inches long each link being about one inch long. The side chains are preferably composed of a series of spring links C each about five inches long and one half inch thick, and made of good steel wire. These links C are in the form of a helix with a hook $C^1$ at each end, which are connected to the link D by an intermediate link, which latter also forms the connecting link between the chains B and A as most clearly shown. The links D are preferably formed of a single piece of wire $D^1$ bent into a substantially V-shaped portion $D^3$ having eyes $D^2$ formed at its ends.

Other forms of spring links may be employed and they may be used in connection with links of the ordinary construction if so desired instead of the link D.

By having the helical spring links in the side chains we provide an elastic binding for the cross chains, which holds said chains to the tire, but at the same time has sufficient elasticity to permit them to yield whenever necessary thereby preventing the cutting and wearing of the tire by its cross chains.

Having thus described our invention what we claim is—

An elastic non-skidding tire chain comprising two circumferential rim chains, composed of a plurality of elastic and inelastic links provided with eyes at their ends connected together, V-shaped links provided with eyes secured in the eyes of the inelastic links, the inelastic links of one chain being arranged opposite the elastic links of the other chain and cross chains connecting said V-shaped links in zigzag order.

CHARLES E. ABRAMS.
CHARLES H. MASON.

Witnesses:
WILLIAM E. SMITH,
NORA H. MALLORY.